United States Patent [19]

Fensch

[11] Patent Number: 4,628,472

[45] Date of Patent: Dec. 9, 1986

[54] BINARY MULTIPLIER USING TERNARY CODE

[75] Inventor: Thierry Fensch, Grenoble, France

[73] Assignee: Societe pour l'Etude et la Fabrication de Circuits Integres Speciaux-Efcis[2], Grenoble, France

[21] Appl. No.: 553,488

[22] Filed: Nov. 18, 1983

[30] Foreign Application Priority Data

Nov. 26, 1982 [FR] France .................. 82 19921

[51] Int. Cl.[4] ............................. G06F 7/52
[52] U.S. Cl. .................. 364/759; 364/760
[58] Field of Search .................. 364/759, 760

[56] References Cited

U.S. PATENT DOCUMENTS

| | | | |
|---|---|---|---|
| 3,691,359 | 9/1972 | Dell et al. | 364/760 |
| 3,730,425 | 5/1973 | Kindell et al. | 364/760 |
| 4,122,527 | 10/1978 | Swiatowiec | 364/760 |
| 4,153,938 | 5/1979 | Ghest et al. | 364/760 |
| 4,546,446 | 10/1985 | Machida | 364/759 |

OTHER PUBLICATIONS

IEEE Transactions on Computers, vol. C.27, No. 3, Mar. 1978 (New York, U.S.A.), P. Corsini et al., "Uniform Shift Multiplication Algorithms without Overflow", pp. 256–258.
K. Hwang: "Computer Arithmetic-Principles, Architecture and Design", 1979, John Wiley & Sons (New York, U.S.A.), pp. 149-151.

Primary Examiner—David H. Malzahn
Attorney, Agent, or Firm—Roland Plottel

[57] ABSTRACT

The invention provides a high-speed binary multiplier.

The binary digits $x_i$ of the multiplicand X and $y_j$ of the multiplier Y (in two complement form) are converted by respective coders into coefficients $a_i$ and $b_j$ such that $$X = a_{m-1}2^{m-1} + \ldots a_1 2^1 + a_0$$

$$Y = b_{n-1}2^{n-1} + \ldots b_1 2^1 + b_0$$

where $a_i$ and $b_j$ can only assume three values 0,1 or $-1$ and where two consecutive coefficients $a_i$ and $a_{i-1}$ and $b_j$ or $b_{j-1}$ cannot both be non zero. $a_i$ and $b_j$ are each represented by a pair of binary logic signals $(r_i, u_i)$ or $(s_j, v_j)$. The signals $(s_j, v_j)$ serve for controlling a routing circuit which further receives as signals to be routed the signals $(r_i, u_i)$ for directing these signals, depending on the values of coefficients $b_j$, to the appropriate inputs of an adder stage operating without carry-over propagation. The outputs of this adder are reconverted into binary form by a decoder.

8 Claims, 8 Drawing Figures

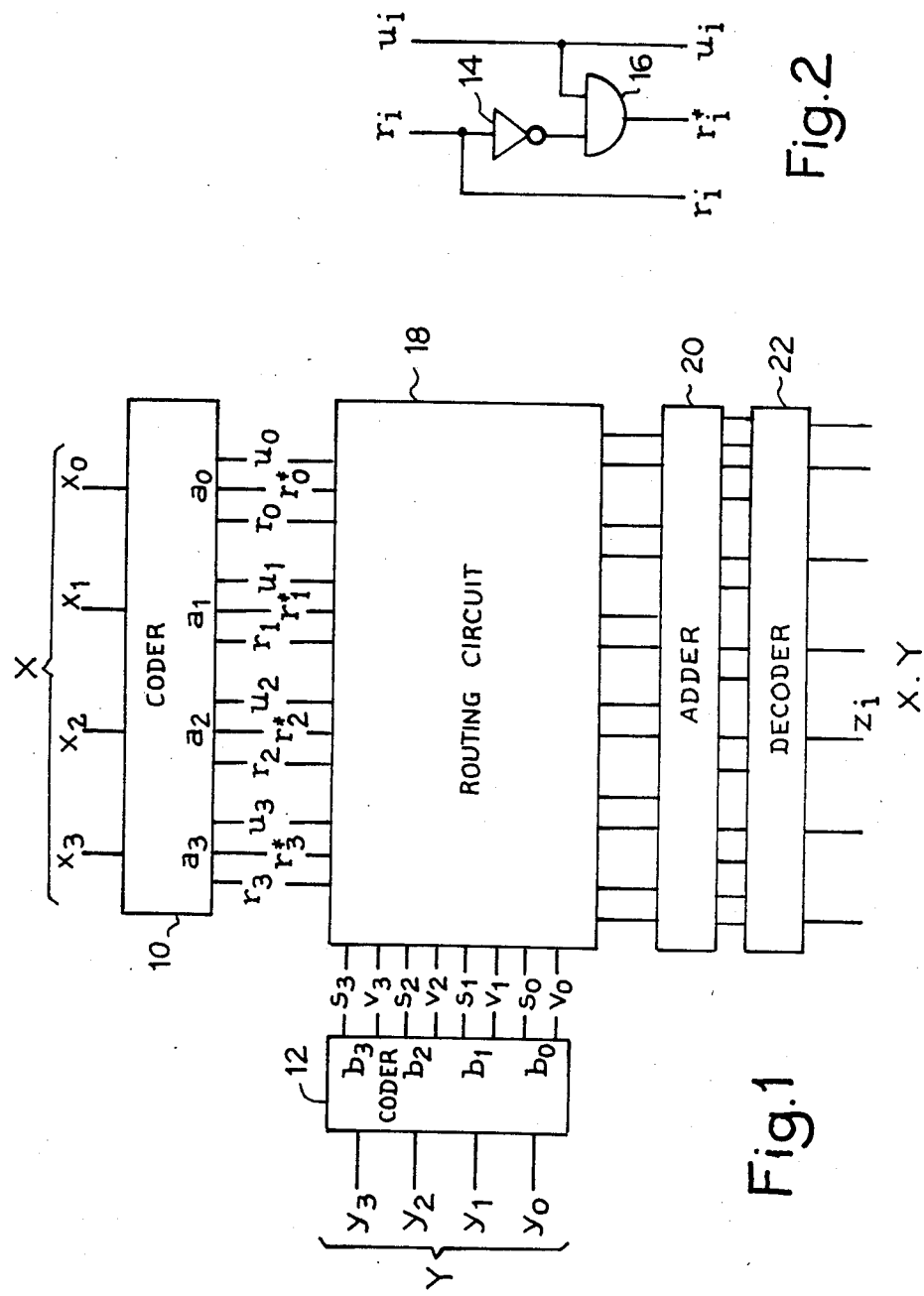

BINARY MULTIPLIER USING TERNARY CODE

BACKGROUND OF THE INVENTION

1. Field of the Invention

The present invention relates to binary digital multipliers.

2. Description of the Prior Art

The principle of binary digit multiplication is well known: the multiplicand is multiplied by the lowest weight digit of the multiplier, then by the digit with the immediately higher weight and so on up to the highest weight; the result each time is a partial product, and the different partial products are added with a lateral leftward shift by a digit between each partial product and the preceding one. The sum of all the partial products progressively shifted forms the result of the multiplication.

Concretely, a partial product can be stored in a register, the result shifted by a rank, added to the next partial product, the result stored in the same register and so on. This is a sequential procedure which is long.

So efforts have been made to design multipliers in which all the partial products are generated simultaneously and added (combinatory and not sequential logic), and, for these multipliers, attempts have been made to increase the working speed, either by reducing the time for adding the partial products or by reducing the number of these partial products.

The adding time may be reduced by using improved adders such as:

- adders with carry-over safeguard in which the carry-overs of the elementary additions of the digits of a number are not propagated from one digit to the next but are kept to be added as a whole;
- adders with anticipated carry-over, in which the value of the carry-over is forecast as a function of the inputs instead of waiting for propagation thereof;
- adders connected together in a particular pattern such as the Wallace tree for grouping together the partial products progressively three by three.

Independently of the reduction of adding time, the number of partial products to be added may also be reduced by appropriately coding the bits of the multiplier. With Booth's algorithm and the variations thereof, only $(n+1)/2$ partial products are generated instead of n for a multiplier with n digits, each of these partial products having four or five possible values which are, X, $-X$, 2X and possibly $-2X$, X being the multiplicand. But this kind of manipulation increases the complexity of the circuit, so the space required thereby.

SUMMARY OF THE INVENTION

The present invention aims at providing a multiplier presenting a better compromise between the operating speed on the one hand and the complexity and space required by the circuit on the other. It uses signal processing such that only $(n+1)/2$ partial products are generated, these partial products each being only able to assume three values 0, X or $-X$ (X being the multiplicand). These partial products are added two by two by an addition without carry-over propagation, which is very important for the propagation of a carry-over between the elementary adders of an n bit adder stage is time consuming, the more so the larger n is.

The binary multiplier of the invention, intended to receive in the form of logic electric signals a first binary number, called multiplicand X, and a second binary number called multiplier Y, so as to supply their product in the form of logic electric signals, comprises a coder for converting the binary signals representing the n digits $y_j$ ($y_j=0$ or 1) of the multiplier Y into a set of logic signals representing n coefficients $b_j$ ($j=0$ to $n-1$) multiplying successive powers of 2 of the binary number Y expressed in the form of the following algebraic sum:

$$Y = b_{n-1}2^{n-1} + b_{n-2}2^{n-2} + \ldots + b_1 2^1 + b_0$$

where the coefficients $b_j$ may take on the values 0, 1 or $-1$ exclusively, and where the product of two consecutive coefficients $b_j$ and $b_{j-1}$ is necessarily zero.

The multiplier also comprises, for arriving at an improvement of the speed/compactness compromise, a coder for converting similarly the binary signals representing the m digits $x_i$ ($x_i=0$ or 1) of the multiplicand X into a set of logic signals representing m coefficients $a_i$ ($i=0$ to $m-1$) multiplying successive powers of 2 of the number X expressed in the form of the following algebraic sum $$X = a_{m-1}2^{m-1} + a_{m-2}2^{m-2} + \ldots + a_1 2^1 + a_0$$

where the coefficients $a_i$ may take on the values 0, 1 or $-1$ exclusively, and where the product of two consecutive coefficients $a_i$ and $a_{i-1}$ is necessarily zero.

Theory shows that this coding of coefficients $x_i$ or $x_j$ into coefficients $a_i$ and $b_j$ having the indicated properties is possible and is even unique.

Coefficients $a_i$ and $b_j$, having three possible values 0, 1 or $-1$, are each preferably represented by a pair of binary logic signals, the coders then supplying, from the m or n binary digits of the multiplicand and of the multiplier m or n pairs of binary logic signals.

It is these pairs of coded logic signals which will be more particularly subjected to the adding and shifting logic operations required for accomplishing the multiplication.

The multiplier of the invention may comprise at least one adder stage formed by a series of elementary adders each receiving two pairs of coded logic signals from the coder of the multiplicand and each supplying a sum and carry-over coded in the same way as the pairs, the successive elementary adders of the series being interconnected and adapted so that they all operate simultaneously without waiting for the propagation of a carry-over between the first and last adders of the series; in other words, the elementary adders of this stage, when they comprise a carry-over input, are adapted so that the carry-over of the addition which they work out does not depend on the carry-over applied to the carry over input.

BRIEF DESCRIPTION OF THE DRAWINGS

Other features and advantages of the invention will appear from reading the following detailed description which is made with reference to the accompanying drawings in which:

FIG. 1 is a block diagram of a four by four bit multiplier in accordance with the invention;

FIG. 2 shows a circuit detail useful in the multiplier;

DESCRIPTION OF THE PREFERRED EMBODIMENTS

Figure 3:
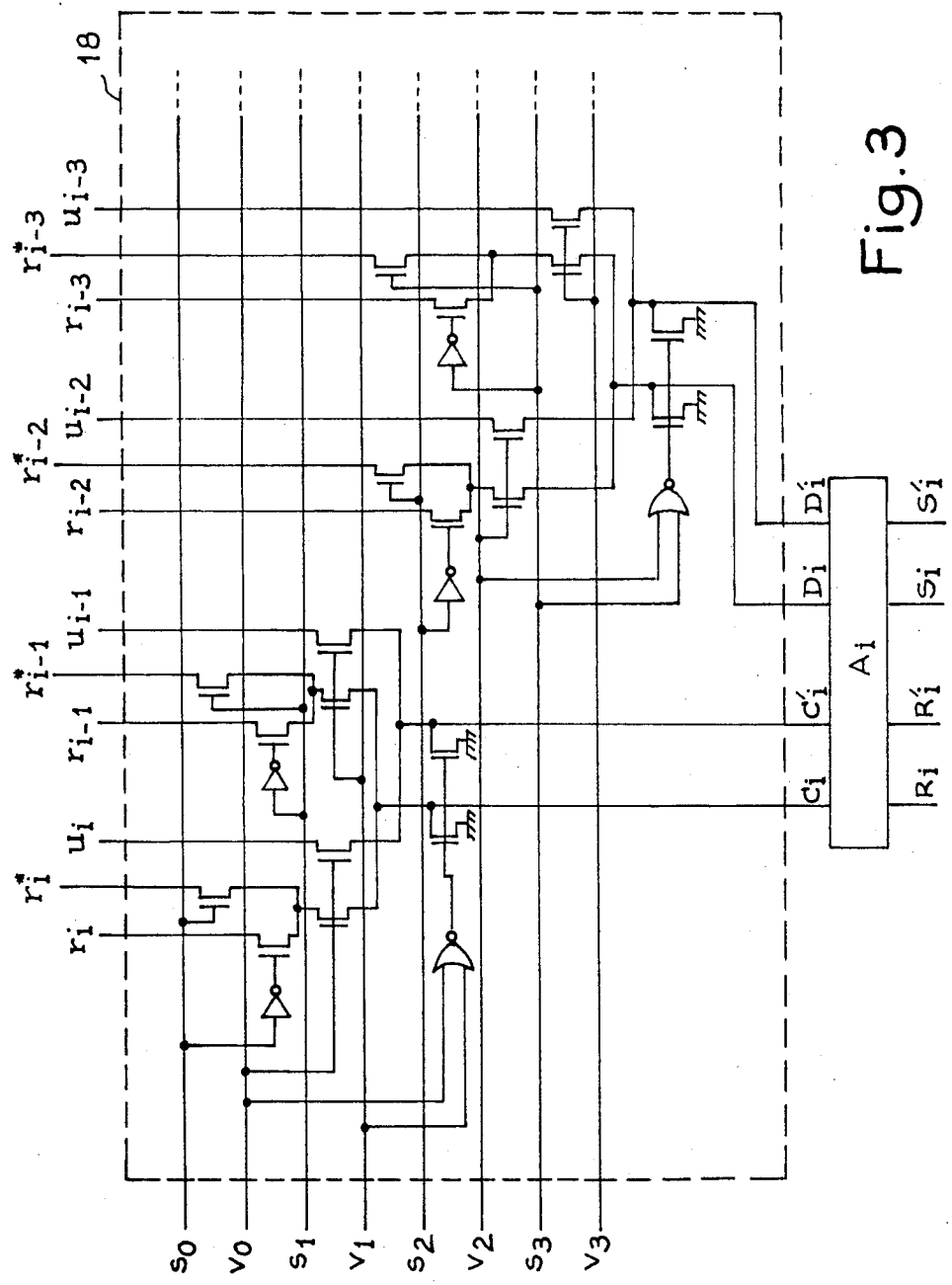
FIG. 3 shows an elementary pattern of the circuit for generating and shifting partial products required for accomplishing the multiplication.

The multiplier of the invention will be described progessively in its different elements, essentially for multiplying a four bit multiplicand by a four bit multiplier; at the appropriate places, it will be stated how to generalize. It will be assumed that operation is with signed input binary numbers, coded with two complement, so able to be wrtten in the form:

for the multiplicand: $X = -x_3 \cdot 2^3 + x_2 \cdot 2^2 + x_1 \cdot 2^1 + x_0$
for the multiplier: $Y = -y_3 \cdot 2^3 + y_2 \cdot 2^2 + y_1 \cdot 2^1 + y_0$ The highest weight bit is a sign bit (0=positive number; 1=negative number).

In the preferred embodiment of the invention, whose block diagram is shown in FIG. 1, each of these two numbers, represented by binary logic signals with the same name $x_0$ to $x_3$, $y_0$ to $y_3$ as the digits which they represent, is applied to a respective coder, 10 for the multiplicand X, 12 for the multiplier Y.

Coder 12 receives four logic input levels corresponding to the binary digits $y_0$, $y_1$, $y_2$, $y_3$ of the multiplier Y and converts them into four pairs of logic output signals, $(s_0,v_0)$, $(s_1,v_1)$, $(s_2,v_2)$, $(s_3,v_3)$, each representing a coefficient $b_0$, $b_1,b_2,b_3$ respectively, where:

$$Y = b_3 \cdot 2^3 + b_2 \cdot 2^2 + b_1 \cdot 2^1 + b_0$$

and where the coefficients $b_j$ have the above mentioned properties, namely that they can only take on three values 0, 1 and −1 and that the product of two consecutive coefficients $b_j$ and $b_{j-1}$ is zero, that is to say that we cannot have two consecutive non zero coefficients.

The correspondence between the value of the coefficient and the logic levels of the pairs of output signals of the coder is the following:

if $b_j = 0$ then $s_j = 0$ $v_j = 0$
$b_j = 1$ $s_j = 0$ $v_j = 1$
$b_j = -1$ $s_j = 1$ $v_j = 1$ The combination $s_j=1$, $v_j=0$ is prohibited and cannot appear at the output of the coder. The correspondence coding between values 0, 1 and −1 and pairs $(s_j,v_j)$ could be different from the one chosen here.

Coder 12 supplies then the multiplier Y in this coded form where $v_j$ represents an absolute value 0 or 1 of a coefficient of a power of 2 and where $s_j$ represents the sign of this coefficient.

Multiplication normally consists in taking the coefficients $b_j$ of the multiplier and in forming the product of each of these coefficients by means of the multiplicand so as to obtain partial products which will be added to each other with appropriate shifts.

If $b_j=0$ the partial product is 0
If $b_j=1$ the partial product is X (multiplicand)
If $b_j=-1$ the partial product is −X The multiplicand X is itself Coded by Coder 10 which transforms, exactly like coder 12, its four logic input levels, corresponding to the binary digits, $x_0$, $x_1$, $x_2$, $x_3$, into four pairs of logic output signals $(r_0,u_0)$, $(r_1,u_1)$, $(r_2,u_2)$, $(r_3,u_3)$ each representing a coefficient $a_0,a_1,a_2$, $a_3$, respectively, where:

$$X = a_3 \cdot 2^3 + a_2 \cdot 2^2 + a_1 \cdot 2^1 + a_0$$

and where the coefficients $a_i$ have the same properties as the coefficients $b_j$ and are coded by the signals $(r_i,u_i)$ in the same way as signals $b_j$ are coded by the signals $(s_j,s_j)$, namely:

if $a_i = 0$ then $r_i = 0$ $u_i = 0$
$a_i = 1$ $r_i = 0$ $u_i = 1$
$a_i = 1$ $r_i = 1$ $u_i = 1$ The combination $r_i=1$, $u_i=0$ is prohibited and cannot appear at the output of coder 10.

Coder 10 then supplies the multiplicand X in this coded form where $u_i$ represents an absolute value 0 or 1 of a coefficient of a power of two and $r_i$ represents the sign of this coefficient (0=positive; 1=negative).

The code of correspondence between the values 0, 1 and −1 and the two logic levels $(r_i,u_i)$ could also be different.

But, in addition, as distinct from coder 12, and because coder 10 of the multiplicand is in fact intended to generate partial products and because these partial products may take the value 0, X or −X with the coding explained above, it is preferable for coder 10 to be capable of supplying at its output both X and −X, i.e. both the values $a_i$ and the opposite thereof $-a_i$.

This is obtained very simply by providing, inside the coder 10 or outside, an inverter further supplying the complement $r_i^*$ of $r_i$, which complement is however forced to zero if $u_i=0$ so as not to end up with the prohibited combination $(r_i=1,u_i=0)$.

FIG. 1 shows then, at the output of coder 10 of the multiplicand, not pairs of output signals $(r_i,u_i)$ but triplets, $(r_i,r_i^*,u_i)$ representing in fact two possible pairs $(r_i,u_i)=a_i$ and $(r_i^*,u_i)=-a_i$.

FIG. 2 shows a very simple logic diagram with an inverter 14 and an inhibiting AND gate 16 for producing the triplets $(r_i,r_i^*,u_i)$ from the pair $(r_i,u_i)$ with inhibition of the prohibited combination $r_i^*,u_i=1,0$.

Referring again to FIG. 1, the triplets $(r_i,r_i^*,u_i)$ are applied as input signals to a logic routing circuit 18 which is controlled by the four pairs $(s_j,v_j)$ of the coder 12 to direct the different input signals ($r_0$ to $r_3$, $r_0^*$ to $r_3^*$, $u_o$ to $u_3$) to well defined outputs as a function of the values of the four control pairs $(s_j,v_j)$ from the coder 12.

In fact, the routing circuit 18 has a function of generating partial products 0, X or −X and appropriately shifting these partial products before addition thereof.

The outputs of the routing circuit 18 are applied to the different inputs of an adder stage 20 for effecting well determined partial product additions as a function of the control pairs $(s_j,v_j)$ and obtaining at the output a multiplication result in coded form. A decoder 22 may be placed at the output of the adder stage 20 for reconverting the output signal pairs of the adder stage into binary code, in accordance with a code which is the inverse of the one used for passing from values $x_o, x_1, x_2, x_3$ to values $(r_o, u_o)$, $(r_1, u_1)$, $(r_2, u_2)$, $(r_3, u_3)$.

Indicentally, if the multiplier had more than four bits, e.g. eight or sixteen, it would be necessary to group these latter in fours and provide a routing circuit and an adder stage for each group of four. The outputs of these adders, reconverted or not into binary form, should themselves be added two by two with appropriate shifts in a second stage then possibly in a third one, etc., until an output result is obtained from a final single adder, which result is reconverted into binary code if need be. On the contrary, the structure of FIG. 1 only requires the coder 10, the routing circuit 18, and adder 20 to have a larger number of inputs and outputs, if the multiplicand has more than 4 bits.

Before describing the detail of coders 10,12 of the routing circuit 18, and of the adder 20, a numerical example will be taken to explain the formation of the partial products and their addition in the case where the multiplier Y has four bits; the multiplier X has here also four bits but this latter point is not important for understanding the operation, generalization to m bits being immediate.

The input binary numbers are taken with the convention called "2 complement"; these are then signed numbers where the highest weight bit is a sign bit.

Let $X = 1011$ ($-5$ in decimal) be multiplied by $Y = 0110$ ($+6$ in decimal).

It can be shown that the only way of writing X and Y by means of coefficients $a_i$ and $b_i$ having the indicated properties is here:

$$X = -2^2 - 2^0 \text{ i.e. } (a_3, a_2, a_1, a_0) = (0, -1, 0, -1)$$

$$Y = 2^3 - 2^1 \text{ i.e. } (b_3, b_2, b_0) = (1, 0, -1, 0)$$

Coder 10 here supplies the following logic level pairs:

$r_3, u_3 = 00$ ($a_3 = 0$)

$r_2, u_2 = 11$ ($a_2 = -1$)

$r_1, u_1 = 00$ ($a_1 = 0$)

$r_o, u_o = 11$ ($a_o = -1$)

as well moreover as the opposite pairs:

$r_3^*, u_3 = 00$ ($-a_3 = 0$)

$r_2^*, u_2 = 01$ ($-a_2 = 1$)

$r_1^*, u_1 = 00$ ($-a_1 = 0$)

$r_o^*, u_o = 01$ ($-a_o = 1$)

Coder 12 supplies the following logic level pairs $s_3, v_3 = 01$ ($b_3 = 1$)

$s_2, v_2 = 00$ ($b_2 = 0$)

$s_1, v_1 = 11$ ($b_1 = -1$)

$s_o, v_o = 00$ ($b_o = 0$)

Multiplication of X by Y may be written as a conventional four digit multiplication but here some digits may be negative:

```
                    0 -1         0 -1
                    1  0        -1  0
                   ───────      ───────
                    0  0         0  0
             0 -(-1)          0 -(-1)
          0  0                0  0
     0 -1  0                 -1
     ──────────────────────────────────
     0 -1  0      0    0      1  0
```

The result is $0, -1, 0, 0, 0, 1, 0$, namely $-2^5 + 2^1 = -30$

The four successively written partial products are respectively $0$, $-X$, $0$, $X$ (in the order of increasing weights). Two partial products only out of four are not zero and contribute to the final result.

This results from the properties of the particular coding used for obtaining the coefficients $b_j$ of the multiplier: we cannot have two consecutive non zero coefficients $b_j$.

This is why, for a multiplier with more than four bits, these bits are grouped together in fours so as to produce each time only two non zero partial products which are added with an appropriate shift.

The additions are made in columns of digits, that is to say that the adder stage 20 comprises essentially as many elementary adders as there are possible columns, namely $m+3$ if the multiplicand has m digits, in practice $m+1$ adders only as will be seen.

Each elementary adder may receive at a first input (actually at a first pair of inputs) a first digit coming from the first or second partial product and at a second input (actually at a second pair of inputs) a second digit coming from the third or fourth partial product.

It is the routing circuit 18 which routs the digits $a_i$ of the multiplicand to the appropriate inputs of the elementary adders which are to receive them, depending on the values of the coefficients $b_j$ of the multiplier so on the outputs of coder 12. The routing circuit 18 also inverts the value of $a_i$ when a partial product to be formed is $-X$ or cancels $a_i$ when the partial product is 0. Finally, it effects the appropriate shift of the digits of the partial products to be added.

Generally, an elementary adder of rank i must work out the sum:

$$a_i \cdot b_0 + a_{i-1} \cdot b_1 + a_{i-2} \cdot b_2 + a_{i-3} \cdot b_3$$

To one input of the adder are assigned the values $a_i \cdot b_o$ and $a_{i-1} \cdot b_1$ (one of the two is necessarily zero) and to the other input the values $a_{i-2} \cdot b_2$ and $a_{i-3} \cdot b_3$ (one of the two is necessarily zero).

Thus the adder receives at its first input:

| | |
|---|---|
| 0 | if $b_o$ and $b_1$ are both zero |
| $a_i$ | if $b_o = 1$ |
| $-a_i$ | if $b_o = -1$ |
| $a_{i-1}$ | if $b_1 = 1$ |
| $-a_{i-1}$ | if $b_1 = -1$ |

It receives at its second input:

| | |
|---|---|
| 0 | if $b_2$ and $b_3$ are both zero |
| $a_{i-2}$ | if $b_2 = 1$ |
| $-a_{i-2}$ | if $b_2 = -1$ |
| $a_{i-3}$ | if $b_3 = 1$ |
| $-a_{i-3}$ | if $b_3 = -1$ |

The other combinations are impossible.

The coefficients of type $a_{i-k}$ are of course considered as zero if $i-k$ is negative.

The preceding logic table allows the logic function of the routing circuit 18 to be completely defined, not forgetting that each coefficient $a_i$ or $b_j$ is coded in the form of two binary logic signals.

FIG. 3 shows a partial diagram of the routing circuit with an array of swtiches (MOS transistors) NOR logic gates and inverters for supplying to the inputs of an elementary adder $A_i$ of rank i the desired coefficient pairs, with the desired signs, as a function of the signals $(s_j,v_j)$ representing the coefficients $b_j$.

Adder $A_i$ has a first pair of inputs $C_i$, $C'_i$ for receiving a pair of binary signals forming the first term of the addition (namely O or $a_i$ or $-a_i$ or $a_{i-1}$ or $-a_{i-1}$ depending on the case, and a second pair of inputs $D_i, D'_i$ for receiving the second term (namely O or $a_{i-2}$ or $-a_{i-2}$ or $a_{i-3}$ or $-a_{i-3}$ depending on the case).

It comprises a first pair of outputs $S_i, S'_i$ for supplying the sum of the two terms of the addition, with the same coding as the coefficients $a_i$ and $b_j$, that is to say that if the sum is equal to 0,1 or $-1$, the first pair of outputs supplies level pairs 00, 01 or 11; the adder comprises finally a second pair of outputs $R_i, R'_i$ for supplying the carry-over of the addition; in fact, this carry-over is different from zero in the case of the addition $1+1$ (carry-over equals 1) or $(-1)+(-1)$ (carry-over equals $-1$). This carry-over has then three possible values and is again expressed with the same coding as the coefficients $a_i$ and $b_j$.

Without describing entirely the diagram of FIG. 3, which is sufficiently clear to be understood by a man skilled in the art, it can be seen that it provides exactly the following routing functions.

1. If $v_0=0$, the transmission of the levels $(r_i,u_i)$ or $(r_i^*,u_i)$ to the inputs $C_i,C'_i$ is prohibited by two MOS transistors controlled by $v_0$; if not it is enabled, $r_i$ or $r_i^*$ being transmitted depending on whether $s_0=0$ or $s_0=1$ by means of two MOS transistors and an inverter;

2. If $v_1=0$, the transmission of the levels $r_{i-1}, u_{i-1}$ or $r_i^*{}_{-1}, u_{i-1}$ to the inputs $C_i, c'_i$ is prohibited by two other MOS transistors controlled by $v_1$; if not it is enabled, and two MOS transistors and an inverter controlled by $s_1$ allow $r_{i-1}$ or $r_i^*{}_{-1}$ to be selected for transmission depending on whether $s_1=0$ or $s_1=1$.

3. If $v_0$ and $v_1$ are both zero, not only are the transmissions prohibited but $C_i$ and $C'_i$ are both forced to a logic level 0 by two transistors controlled by a NOR gate receiving both $v_0$ and $v_1$.

4. The same basic circuit is used for the transmission of $r_{i-2}$, $r^*_{i-2}$, $u_{i-2}$ or $r_{i-3}$, $r_r^*{}_{-3}$ to the inputs $D_i$, $D'_i$, routing being achieved under the control of $v_2$, $v_3$ and $s_2, s_3$ instead of $v_0, v_1, s_0, s_1$ respectively.

The diagram of FIG. 3 only shows one pattern which must be repeated as many times as there are adders so theoretically $m+3$ times for an m bit multiplicand multiplied by a group of four bits of the multiplier. In fact, there are no adders of rank 0 and 1; the routing circuit supplies directly, for these two ranks, the sums of digits of partial products, for these sums are reduced to a single term.

Figure 4:
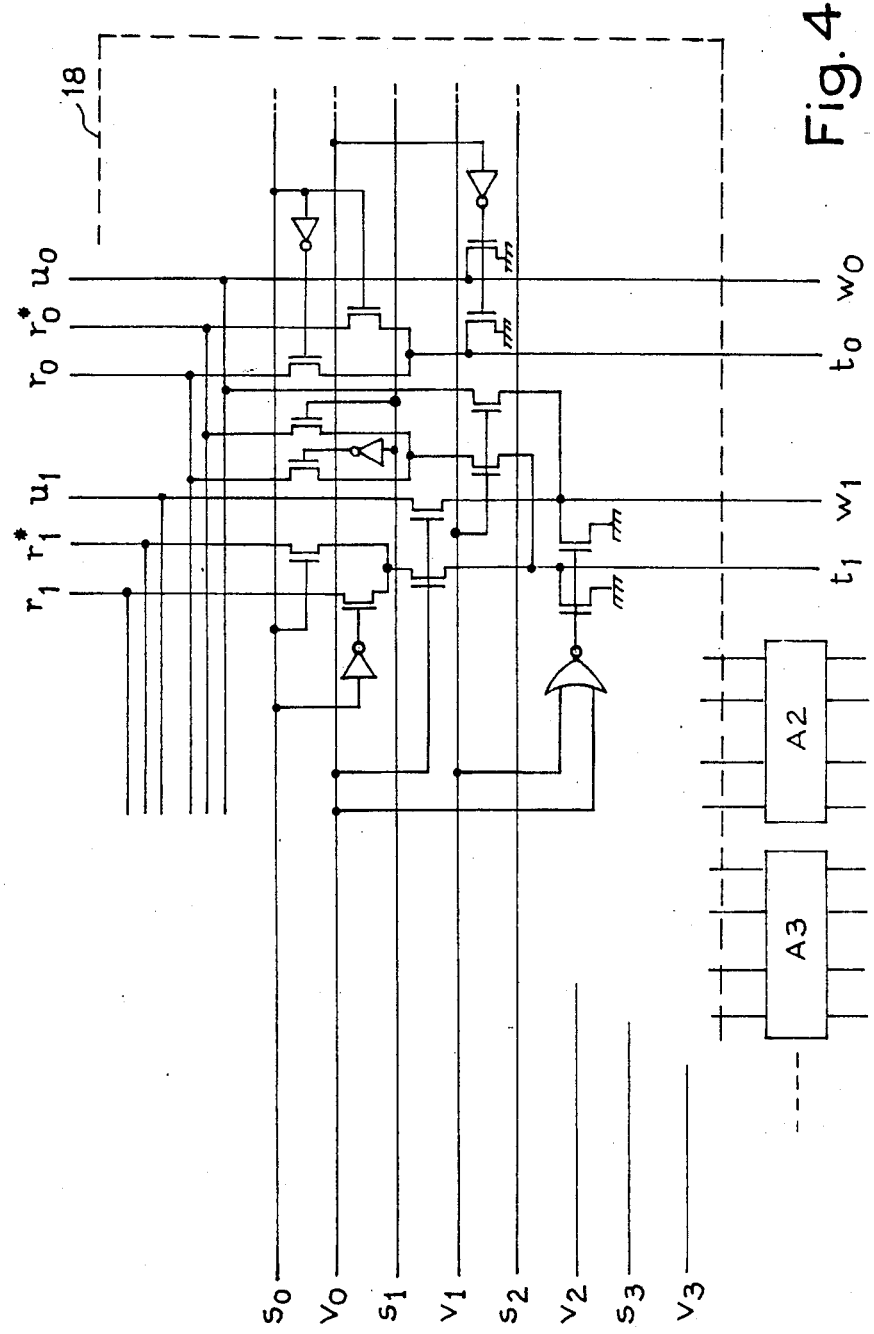
FIG. 4 shows a detail of the circuit for generating and shifting partial products, this detail concerning the lowest weight bits of the partial products.

FIG. 4 shows one embodiment of the portion of the routing circuit concerning the sums of digits of partial products of rank 0 and 1; this circuit portion is moreover only a simplification of the circuit of FIG. 3 taking into account that for $i=1$ and $i=0$, $a_{i-3}$, $a_{i-2}$ and possibly $a_{i-1}$ must be considered as zero;

for rank 0, the only partial product to be transmitted, as digit of zero rank in the result of the multiplication, is $a_0 \cdot b_0$ so either 0 if $b_0=0$ (i.e. in practice if $v_0=0$), or $a_0$ $(r_o, u_o)$ if $b_0=1$ (i.e. if $s_o=0$ and $v_o=1$), or finally $-a_o$, i.e. $(r_0^*, u_0)$, if $s_0=1$ and $v_0=1$. The routing logic circuit portion shown in FIG. 4 supplies a pair of signals $t_o, w_o$, representing $a_o \cdot b_o$ with the same coding, on two logic levels, as the coefficients $a_i$ and $b_j$;

for rank 1, only one partial product is non zero but it may be either $a_o \cdot b_1$ if $b_0=0$; or $a_1 \cdot b_o$ if $b_1$ is zero; the circuit of FIG. 4 establishes then also two signals $t_1, w_1$ representing either $a_o \cdot b_1$ or $a_1 \cdot b_o$ depending on the case which is presented, always with the same coding.

$t_o, w_o$, and $t_1, w_1$ represent the values $(0, +1$ or $-1)$ of the two lowest weight digits of the result of the multiplication by four bits.

The other digits $t_i, w_i$ are established from elementary adders $A_2, A_3$ etc. receiving the outputs of the routing circuit 18.

Figure 5:
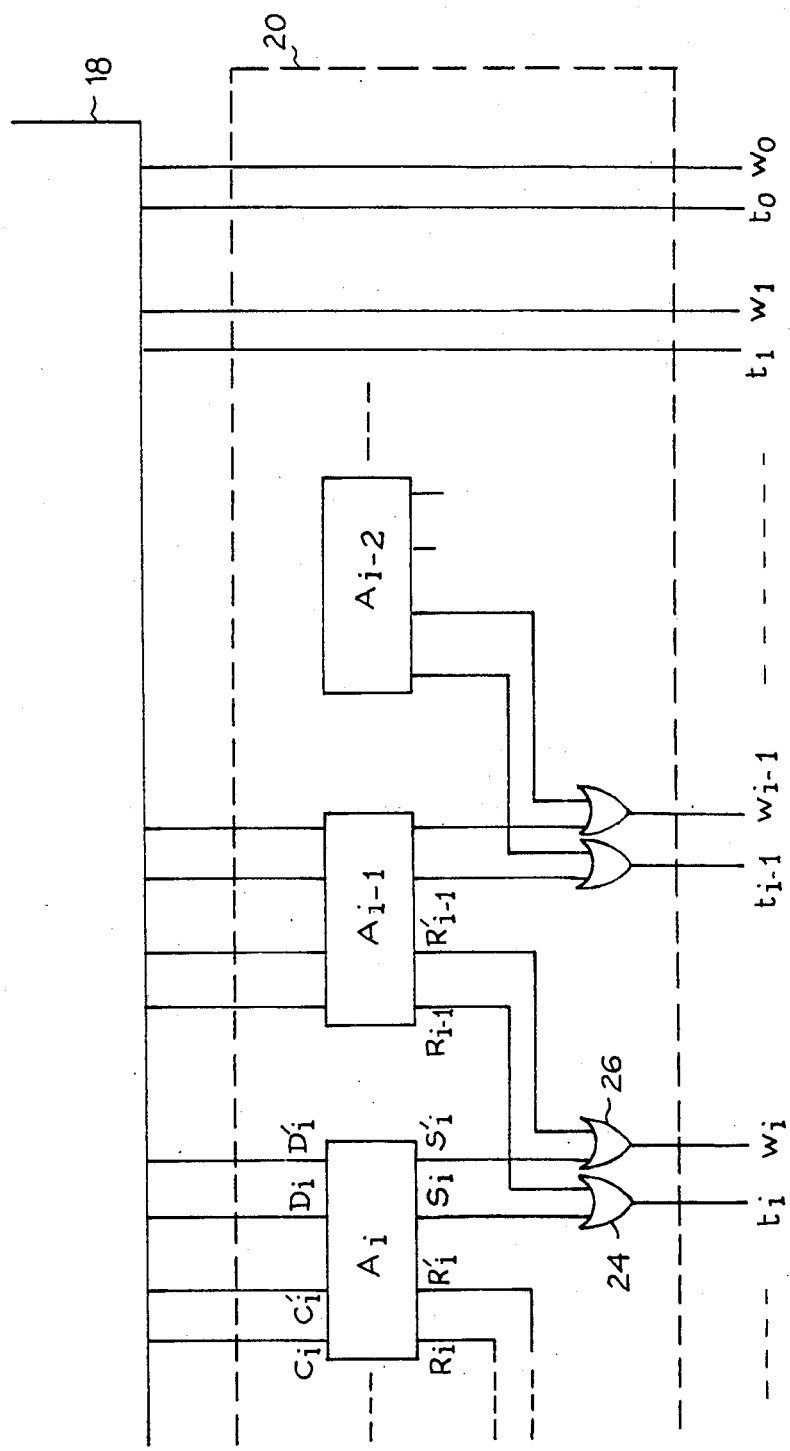
FIG. 5 shows the diagram of the partial product adder stage.

The block diagram of FIG. 5 shows the adder stage 20 formed essentially from elementary adders $A_2$ to $A_{m+2}$ each having two pairs of inputs $C_i, C'_i$ and $D_i$, $D'_i$ and a pair of "sum" outputs $S_i$, $S'_i$ and a pair of "carry-over" outputs $R_i$, $R'_i$. Sum and carry-over are coded on two logic levels like all the other coefficients capable of assuming the three values $0, 1, -1$.

Here, a very important remark must be made: because the multiplicand is coded by coefficients $a_i$ such that $a_i$ and $a_{i-1}$ cannot be both non zero, the partial products of the multiplication, which products are transmitted to the elementary adders, present the same property.

Thus, if by chance in the same column of digits to be added there are two digits 1 or two digits $-1$, we can be certain that each of these digits has at its right and at its left a zero, so that:

1. The addition in question will not be disturbed by a carry-over of the lower rank addition, 2. This addition will itself give rise to a carry-over 1 or $-1$ which will have to be added to the result of the higher rank addition; but since this latter only comprises an addition of zeros, its result will be equal to the carry-over 1 or $-1$, but will not give rise to a new carry-over.

There is then no case where the carry-over may be propagated over several successsive adders as is the case in normal additions.

This is why an arrangement and interconnection of the elementary adders is provided such that all the adders may work simultaneously without having to wait for the carry-over of the preceding rank addition. This carry-over is simply added at the output of the adders by a logic gate which takes into account the different cases where a carry-over may appear.

The elementary adders $A_i$ are here "half-adders" in this sense that, though they each produce a sum and a carry-over, they do not however have an input for the carry-over from the preceding stage which would be likely to modify their own carry-over result.

It can be seen in FIG. 5 that two OR gates 24 and 26 are provided for each adder $A_i$. Gate 24 receives the output $S_i$ of adder $A_i$ and output $R_i$ of adder $A_{i-1}$. Gate 26 receives the outputs $S'_i$ and $R'_{i-1}$. Gates 24 and 26 supply the logic levels $t_i, w_i$ representing the overall result of the operation, namely the value of the digit of rank i of the result of the multiplication.

For adder $A_2$, these OR gates are useless for there is no preceding carry-over.

With these OR gates it is verified that:

on the one hand, the carry-over of an adder cannot be affected by the carry-over of the preceding stage;

on the other hand, if the carry-over of adder $A_{i-1}$ is 00, then the sum 00 or 01 or 11 supplied by the adder $A_i$ is not modified by passing through the OR gates; finally, if the carry-over of adder $A_{i-1}$ is 01 or 11, it is because adder $A_i$ must only receive zeros and supply at its "sum" outputs a pair of levels 00 which do not modify the passage through the OR gate of the carry-over 01 or 11.

Figure 6:
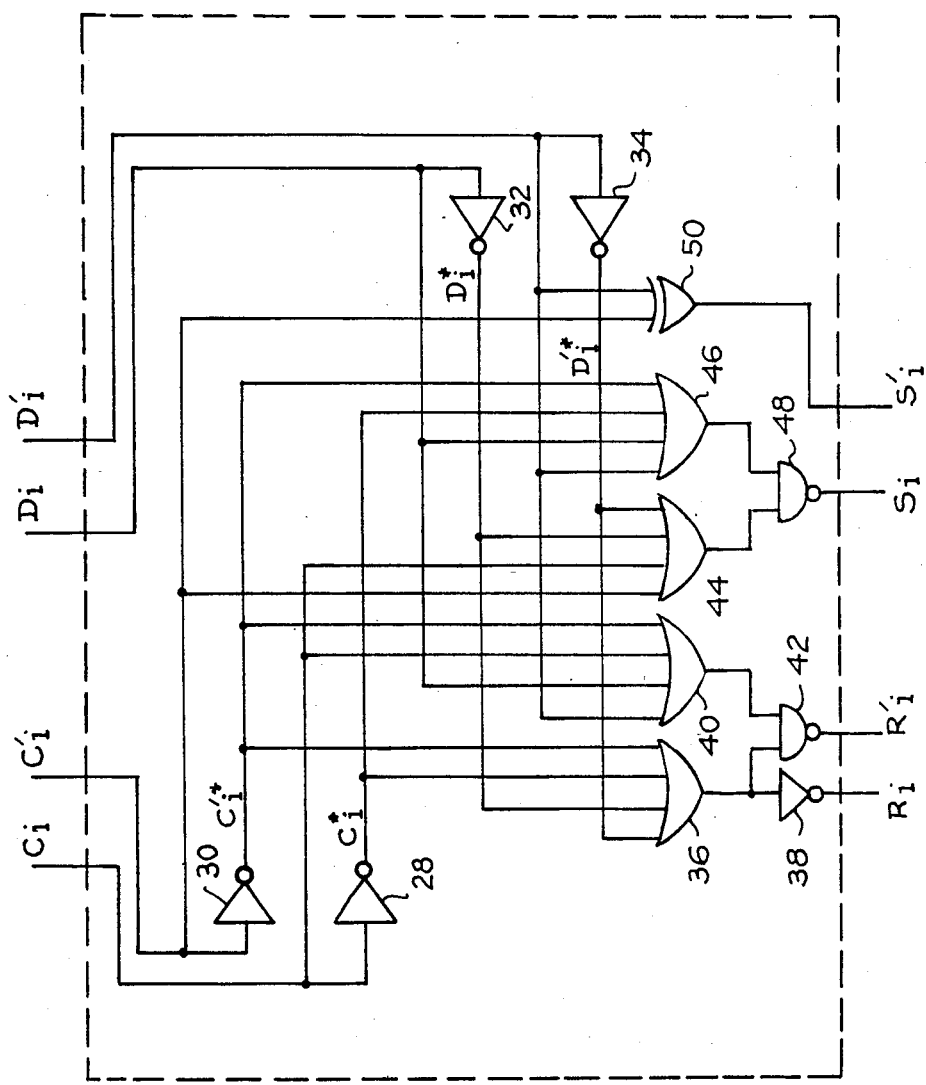
FIG. 6 shows the diagram of an elementary adder without carry-over input capable of adding two coded digits of value 0, 1 or −1, each on two logic levels, and supplying a sum and carry-over coded in the same way.

FIG. 6 shows a detailed diagram of an elementary adder $A_i$. This adder must supply a result, sum and carry-over, corresponding to the addition of two digits which may assume only the values 0, 1 and $-1$. It must respect the following equalities:

$$0 + 0 = \text{sum } 0, \text{ carry-over } 0$$
$$0 + 1 \text{ or } 1 + 0 = \text{sum } 1, \text{ carry-over } 0$$
$$0 + (-1) \text{ or } (-1) + 0 = \text{sum } -1, \text{ carry-over } 0$$
$$1 + (-1) \text{ or } (-1) + 1 = \text{sum } 0, \text{ carry-over } 0$$
$$1 + 1 = \text{sum } 0, \text{ carry-over } 0$$
$$(-1) + (-1) = \text{sum } 0, \text{ carry-over } -1$$

These equalities define the logic functions to be provided, when numbers 0, 1 and $-1$ are represented by pairs of logic levels 00, 01 or 11 not only at the inputs but also at the outputs of the adder.

A corresponding logic diagram is shown in FIG. 6. The names of the inputs and outputs are those of FIGS. 4 and 5.

The elementary adder $A_i$ comprises:

four inverters 28,30,32,34 for producing the logic complements $C_i^*$, $C'_i^*$, $D_i^*$, $D'_i^*$ of the levels of the inputs $C_i$, $C'_i$, $D_i$, $D'_i$, a four input OR gate 36 receiving the signals $C_i^*$, $C'_i^*$, $D_i^*$, $D'_i^*$ and followed by an inverter supplying at the output $R_i$ the sign of the carry-over of the addition an OR gate 40 receiving $C_i$, $C'_i$, $D_i$, $D'_i$ and an AND gate 42 receiving the outputs of the OR gates 36, and 40; the output of the AND gate 42 supplies to the output $R'_i$ the absolute value of the carry-over;

an OR gate 44 receiving $C_i$, $C'_i$, $D_i^*$, $D'_i^*$, an OR gate 46 receiving $C_i^*$, $C'_i^*$, $D_i$, $D'_i$ and a NAND gate 48 receiving the outputs of the OR gates 44 and 46 and supplying at the output $S_i$ the sign of the sum effected;

an exclusive OR gate 50 receiving $C'_i$ and $D'_i$ and supplying at the output $S'_i$ the absolute value of the sum.

The detail of one of the coders 10 or 12 will now be described whose role is to find, from the number X or Y applied in binary form to an input of the multiplier, coefficients $a_i$, $b_j$ with three values 0, 1, $-1$, the 1 or $-1$ being necessarily separated by zeros, and coding these coefficients on two logic levels 00, 01 and 11 while prohibiting the combination 10.

Coding of the binary coefficients $x_i$ ($i=0$ to $m-1$) into ternary coefficients $a_i$ takes place in the following way, the number X being written in the so-called "two complement" form where the highest weight bit is a sign bit.

Intermediate logic signals $p_i$ and $q_i$ are established such that:

$p_i$ is the result of the exclusive OR of $x_i$ and $x_{i-1}$ with $p_o = x_o$, $q_i$ is the logic product of $p_i$ and of the complement of $q_{i-1}$ with $q_o = x_o$, Then is written:

$$a_i = (1 - 2x_{i+1})q_i \text{ with } x_m = x_{m-1}$$

(the number x only having m digits $x_o$ to $x_{m-1}$).

Such is the algorithm used here for calculating the coefficients $a_i$.

We have then $a_i = q_i$ if $x_{i+1} = 0$ and $a_i = -q_i$ if $x_{i+1} = 1$.

$q_i$ is a logic signal with two possible levels 0 or 1; $a_i$ may take three values 0, 1 or $-1$ and is represented by two binary signals $r_i$ and $u_i$.

$r_i$ represents the sign of $a_i$. If $r_i = 0$ is chosen for a positive sign and $r_i = 1$ for a negative sign, we may assume $r_i = x_{i+1}$ since it is for $x_{i+1} = 1$ that $a_i = -q_i$ and for $x_{i+1} = 0$ that $a_i = q_i$.

In fact, it will be assumed that $r_i = x_{i+1} \cdot q_i$ so as to have even so a positive sign if $q_i = 0$ (prohibition of the combination 1,0 for $r_i, u_i$).

$u_i$ represents the absolute value of $a_i$; $u_i$ is then equal to $q_i$.

Figure 7:
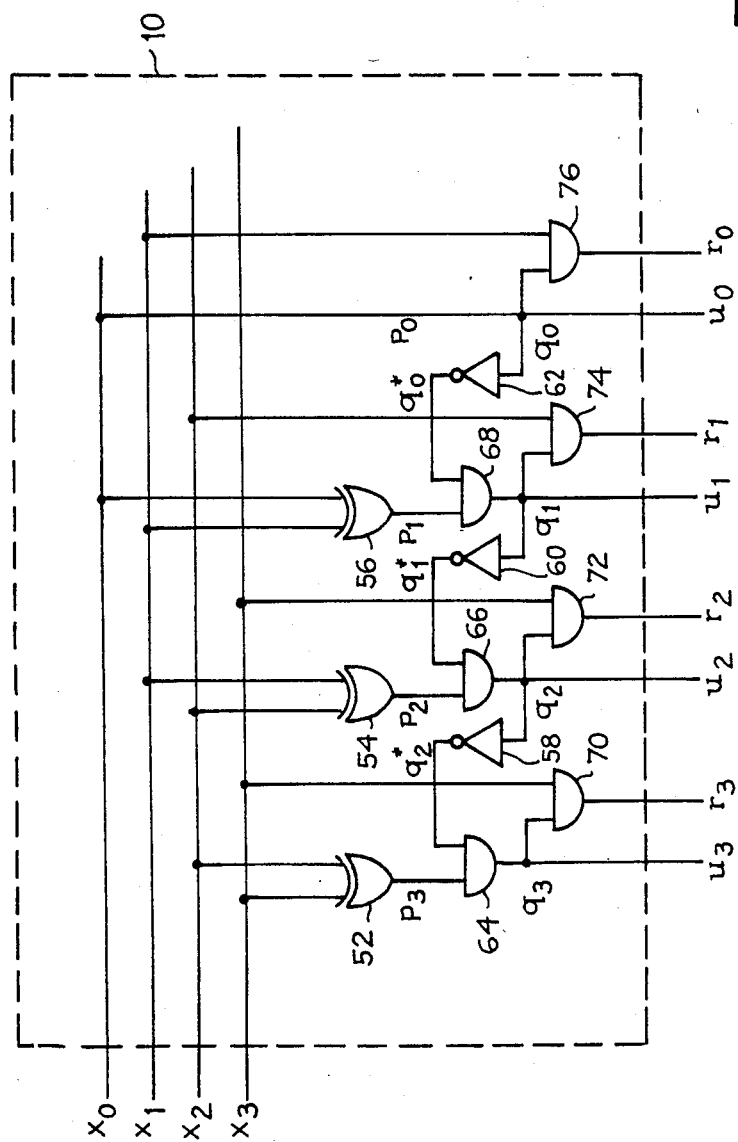
FIG. 7 shows a diagram of a coder for the multiplicand (or multiplier)

From the above is derived the structure of the logic coding circuit shown in FIG. 7 for four input binary coefficients $x_o$ to $x_3$; three exclusive OR gates 52,54,56 establishing the levels $p_3$, $p_2$, $p_1$; $p_o$ is equal to $x_o$ and to $q_o$ and $u_o$. Three inverters 58,60,62 establish from $q_2$, $q_1$, $q_o$ the complements $q_2^*$, $q_1^*$, $q_o^*$ of these levels.

Three two-input AND gates 64,66,68 whose outputs establish levels $q_3$, $q_2$, $q_1$, which are also the levels $u_3$, $u_2$, $u_1$, each receive respectively $p_3$ and $q_2^*$, $p_2$ and $q_1^*$, $p_1$ and $q_o^*$.

Finally, four AND gates 70,72,74,76 receive respectively $q_3$ and $x_3$, $q_2$ and $x_3$, $q_1$ and $x_2$, $q_o$ and $x_1$ and establish respectively the levels $r_3$, $r_2$, $r_1$, $r_o$.

The coder of the multiplier is exactly the same: it is sufficient to replace above the $x_i$ by $y_j$ and the signals $r_i, u_i$ by signals $s_j, v_j$.

Finally, once the result of the multiplication is obtained in the form of $m+n-1$ coefficients $c_i$, each represented by two binary levels $t_i, w_i$ so that if $t_i, w_i$ equals 0, 0 then $c_i = 0$ if $t_i, w_i = 0,1$, then $c_i = 1$ if $t_i, w_i = 1,1$, then $c_i = -1$, the result of the multiplication is:

$$Z = c_{m+n-2}2^{m+n-2} + \ldots c_i 2^i + \ldots + c_o$$

It is desirable to reconvert coefficients $c_i$ with three possible values into binary coefficients $z_i$ with two values 0,1 with:

$$Z = -z_{m+n-1}2^{m+n-1} + \ldots z_i 2^i + \ldots + z_o$$

(expression of number Z in so-called "two complement" binary code).

Decoding is in fact very simple: the positive or zero coefficients $c_i$ ($t_i = 0$) are separated from the negative or zero coefficients $c_i$ ($t_i = 1$ or $w_i = 0$).

The series of positive coefficients corresponds to a first positive number in binary form.

The series of the negative coefficients corresponds to the opposite of a second positive number.

The number Z is then written in the form of a subtraction of two positive binary numbers. Each of these numbers may then be written in "two complement" form by adding a high weight sign bit and adding them; for the first number, the added sign bit is 0, for the second the sign bit is 1 and the corresponding two complement number is established by complementing the bits of the second number and adding a lowest weight unit.

The two numbers written "in two complement" form are then added so as to give the number Z in two complement form.

Figure 8:
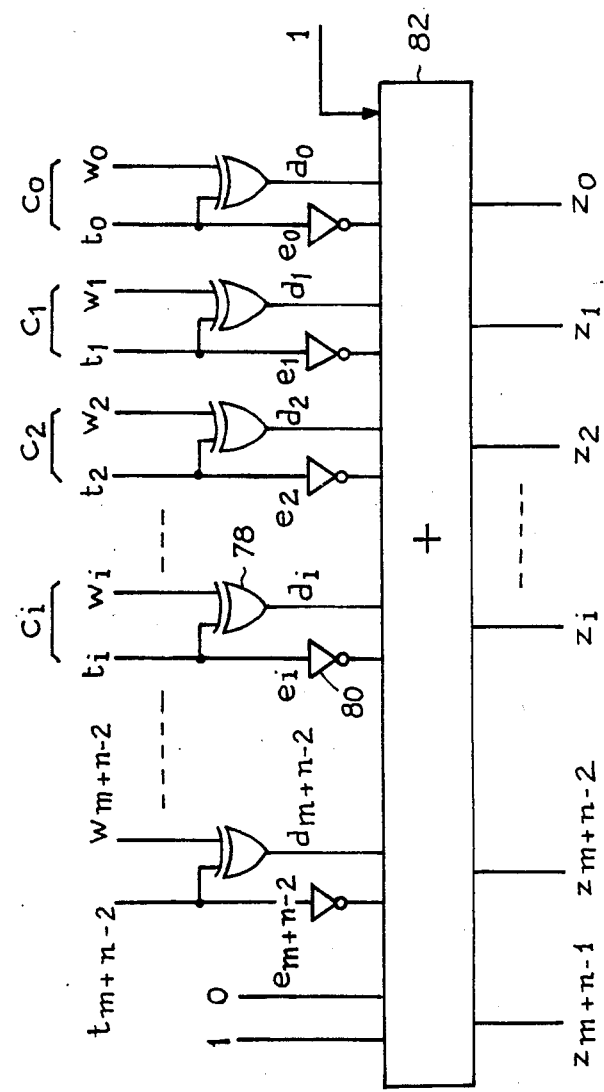
FIG. 8 is a diagram of a decoder for reconverting the result of the multiplication into binary form.

FIG. 8 shows the corresponding decoding circuit.

From each coefficient $c_i$ a binary coefficient $d_i$ is established for the positive number ($d_i=0$ if $c_i$ is equal to 0 or $-1$, $d_i=1$ if $c_i=1$); $d_i$ is obtained at the output of an exclusive OR gate 78 receiving $t_i$ and $w_i$, that is to say the sign and the absolute value of the coefficient $c_i$.

A coefficient $e_i$ is also established for the negative number ($e_i=0$ if $c_i=0$ or 1; $e_i=1$ if $c_i=-1$); $e_i$ is quite simply identical to the sign bit $t_i$ of the coefficient $c_i$.

A sign bit 0 is added to the positive number and a sign bit 1 to the negative number.

The sum of the positive number and of the negative number is provided by bit by bit addition of the coefficient $d_i$ and of the complement of the coefficient $e_i$ (established by an inverter 80) and by adding a lightest weight unit.

This addition is effected in a conventional binary adder 82 with m+n bits, having a carry-over input forced to 1 (for adding a lightest weight unit), inputs receiving the levels $t_i$ and inputs receiving the complements of the levels $e_i$. Moreover, the pair of heaviest weight inputs receive 0,1, i.e. the respective sign bits of the positive number and of the negative number.

The result of the addition is a series of logic levels $z_o$ to $z_{m+n-1}$ representing the binary coefficients (in two complement form) of the result of the multiplication.

In fact, it may be shown that, considering the numbers of bits m and n of the multiplier and of the multiplicand, expressed in two complement form, the result of the multiplication expressed in the same convention should only comprise $m+n-1$ coefficients $z_o$ to $z_{m+n-2}$, including a sign bit which would be $z_{m+n-2}$.

It may be concluded that in reality it is sufficient to provide an adder 82 with $m+n-1$ bits by suppressing the inputs of signs 0 and 1 and the output $z_{m+n-1}$ which are useless because:

(a) $z_{m+n-1}$ is normally equal to $z_{m+n-2}$ (b) and, in two complement form, if the two highest weight bits are identical, they may be replaced by a single sign bit having the same value.

To finish this description of the multipliers of the invention, it may be pointed out that in the case of the multiplier having more than four bits, for example sixteen bits, these bits are grouped in fours and coefficients $c_i$ (logic levels $t_i, W_i$) are obtained as a result of the four multiplications. These levels ray be introduced into adders such as the adder stage 20, except that it will then be an adder with carry-over propagation and so each elementary adder will in fact be formed of two half-adders of the type shown in FIG. 6. It is also possible for the results of the multiplications by four bits to be converted into binary form (two complement form) and added to each other in conventional binary adders.

In the whole of the preceding description, it should be considered that the choice of code 00, 01, or 11 for representing a value 0, 1 or $-1$ respectively with a prohibited combination 10, is one possible choice among several and that if this code is changed, it is necessary to effect slight adaptations of the logic structure which results therefrom in the logic circuits which have been described.

Finally, the preferred embodiment which has been described comprises a coder for the multiplier and a coder for the multiplicand. If only the first were used, an advantage would be gained essentially on the number of partial products to be added, but the adder stage 20 would be a binary adder (so with carry-over propagation) and there would be no decoder 22.

What is claimed is:

1. A binary multiplier circuit for receiving in the form of logic electric signal a first binary number X and a second binary number Y, so as to supply in the form of logic electric signal the product of these two numbers, said multiplier circuit comprising a coder for converting n binary signals $y_j$ (j=0 to n−1) representing number Y into n pairs of binary signals ($s_j,v_j$), each pair representing one coefficient $b_j$(j=0 to n=1), where $b_j$ can be 0, 1 or $-1$ and where one signal ($s_j$) of the pair represents the sign of $b_j$ and the other signal ($v_j$) of the pair represents the module of $b_j$, where the product of two consecutive coefficients $b_j$ and $b_{j-1}$ is zero, and where the coefficients $b_j$ are such that $$Y=b_{n-1}2^{n-1}+b_{n-2}2^{n-2}+\ldots b_1 2^1+b_0,$$

said coder comprising, for each integer value of indicia j between 1 and n, an EXCLUSIVE-OR gate receiving $y_i$ and $y_{i-1}$, an AND gate receiving on a first input an output $p_j$ of the EXCLUSIVE-OR gate, and receiving on a second input the logical complement of $v_{j-1}$, said AND gate having an output supplying the binary signal $v_j$, a further AND gate having a first input receiving signal $v_j$ and a second input receiving signal $y_{j+1}$, except that for j=n−1 the second input of said further AND gate receives $y_{n-1}$, said further AND gate having an output supplying signal $s_j$, said coder having outputs for supplying binary signals $s_j$ and $v_j$(j=1 to n−1) and further comprising two outputs for supplying respectively a signal $v_o$ which is equal to $y_o$ and a signal $s_o$ which is the logical AND of $y_o$ and $y_1$.

2. A binary multiplier circuit according to claim 1 wherein said number X is the multiplicand and said number Y is the multiplier, the multiplier circuit comprising a routing circuit receiving binary signals representing number X and a binary adder stage, said routing circuit being controlled by the outputs $s_j$, $v_j$ of the coder, and said adder receiving outputs from the routing circuit.

3. A binary multiplier circuit for receiving in the form of logic electric signal a first binary number X and a second binary number Y, so as to supply in the form of logic electric signal the product of these two numbers, said multiplier circuit comprising a coder for converting n binary signals $y_j$(j=0 to n−1) representing number Y into n pairs of binary signals ($s_j,v_j$), each pair representing one coefficient $b_j$(j=0 to n−1), where $b_j$ can be 0, 1 or $-1$ and where one signal ($s_j$) of the pair represents the sign of $b_j$ and the other signal ($v_j$) of the pair represents the module of $b_j$, where the product of two consecutive coefficients $b_j$ and $b_{j-1}$ is zero, and where the coefficients $b_j$ are such that $$Y=b_{n-1}2^{n-1}+b_{n-2}2^{n-2}+\ldots b_1 2^1+b_0,$$

said multiplier circuit further comprising a second coder for converting m binary signals $x_i$ representing number X into m pairs of binary sigals ($r_i,u_j$), each pair representing one coefficient $a_i$(i=0 to m−1), where $a_i$ can be 0, 1 or $-1$ and where one signal $r_i$ of the pair represents the sign of $a_i$ and the other signal $u_i$ of the pair represents the module of $a_i$, where the product of two consecutive coefficients $a_i$ and $a_{i-1}$ is zero, and where the coefficient $a_i$ are such that $$X=a_{m-1}2^{m-1}+a_{m-2}2^{m-2}+\ldots a_1 2^1 + a_0$$

said multiplier further comprising a routing circuit and a binary adder stage, said routing circuit receiving the outputs of said second coder and the routing circuit being controlled by the outputs of said first coder, and said adder stage receiving outputs from the routing circuit.

4. A binary multiplier circuit according to claim 3, wherein said second coder further supplies m binary logic signal $r_i^*$ where $r_i^*$ is the complement of $r_i$ if $u_i=1$ and is zero if $u_i=0$.

5. The multiplier as claimed in claim 4 wherein said routing circuit transmits to elementary adders of said adder stage having a first and a second pair of inputs the following signals depending on the four pairs of control signals:

on the first pair of inputs $(C_i,C'_i)$

| | |
|---|---|
| | 0 if $b_0$ and $b_1$ are both zero |
| $r_i,u_i$ | if $b_0=1$ |
| $r_i^*,u_i$ | if $b_0=-1$ |
| $r_{i-1},u_{i-1}$ | if $b_1=1$ |
| $r^*_{i-1},u_{i-1}$ | if $b_1=-1$ | at the second pair of inputs $(D_i,D'_i)$

| | |
|---|---|
| | 0 if $b_2$ and $b_3$ are both zero |
| $r_{i-2},u_{i-2}$ | if $b_2=1$ |
| $r^*_{i-2},u_{i-2}$ | if $b_2=-1$ |
| $r_{i-3},u_{i-3}$ | if $b_3=1$ |
| $r^*_{i-3},u_{i-3}$ | if $b_3=1$ | the signals of the type $u_{i-k}$ or $r_{i-k}$ being logic levels 0 if i−k is negative and $r_i^*$ being the complement of $r_i$ if $u_i=1$ or 0 if $u_i=0$.

6. The multiplier as claimed in claim 5 wherein said elementary adders supply at their outputs output sum and carry-over pairs according to coding having the same significance as the coding of coefficient $a_i$ or $b_j$ into signals $(r_i,u_i)$ or $(s_j,v_j)$, and the "sum" outputs of an adder are each applied to an input of a respective OR gate, these gates further receiving the carry-over outputs from the elementary adder of immediately lower rank.

7. The multiplier as claimed in one of claims 1 to 6 further comprising a decoder receiving pairs of logic signals $(t_i,w_i)$ each representing a coefficient $c_i$ with three values o,1 or −1, for converting the number Z represented by these pairs, $Z=c_{m+n-1}2^{m+n-2}+\ldots c_1 2^1 + c_0$ into a binary number represented by binary logic outputs $z_i$ with:

$$Z=-z_{m+n-1}2^{m+n-1}+z_{m+n-2}2^{m+n-2}+\ldots z_1 2^1+z_0$$

8. A multiplier as claimed in claim 7 wherein said decoder comprises an exclusive OR gate receiving the signals $t_i$ and $w_i$ and supplying a signal $d_i$, an inverter receiving the signal $t_i$ and a binary adder having a carry-over input forced to the logic level 1 and pairs of inputs for signals to be added, each pair of inputs receiving the output of the exclusive OR gate and the output of the inverter.

* * * * *